(12) United States Patent
Boban et al.

(10) Patent No.: US 10,041,603 B2
(45) Date of Patent: Aug. 7, 2018

(54) HYDRAULIC VALVE

(71) Applicant: Hilite Germany GmbH, Marktheidenfeld (DE)

(72) Inventors: Drazen Boban, Nuertingen (DE); Andreas Eisenberger, Nuertingen (DE); Christian Hertwig, Fellbach (DE); Thomas Jacob, Stuttgart (DE); Andreas Knecht, Kusterdingen (DE)

(73) Assignee: Hilite Germany GmbH, Marktheidenfeld (DE)

( * ) Notice: Subject to any disclaimer, the term of this patent is extended or adjusted under 35 U.S.C. 154(b) by 0 days.

(21) Appl. No.: 14/790,511

(22) Filed: Jul. 2, 2015

(65) Prior Publication Data
US 2016/0084397 A1 Mar. 24, 2016

(30) Foreign Application Priority Data

Sep. 18, 2014 (DE) .................. 10 2014 013 602

(51) Int. Cl.
*F16K 27/04* (2006.01)
*F16K 31/06* (2006.01)
(Continued)

(52) U.S. Cl.
CPC ............ *F16K 27/04* (2013.01); *F16K 3/0209* (2013.01); *F16K 3/0218* (2013.01);
(Continued)

(58) Field of Classification Search
CPC .......... H01F 7/1607; Y10T 137/86622; F16K 27/04; F16K 3/0209; F16K 3/0218; F16K 3/0254; F16K 31/613; F16K 31/0675
(Continued)

(56) References Cited

U.S. PATENT DOCUMENTS

2002/0175569 A1* 11/2002 Komiyama ............... F01N 3/22
310/12.04
2004/0178378 A1* 9/2004 Collins .................. B60T 8/363
251/129.15
(Continued)

FOREIGN PATENT DOCUMENTS

CN 201827491 U 5/2013
DE 10249182 A1 4/2003
(Continued)

OTHER PUBLICATIONS

Translation of JP 2008157270; dated Jul. 10, 2008.*

*Primary Examiner* — Kevin Murphy
*Assistant Examiner* — Kelsey Cary
(74) *Attorney, Agent, or Firm* — Von Rohrscheidt Patents

(57) ABSTRACT

A hydraulic valve, in particular a hydraulic transmission valve including a magnetizable housing which envelops a magnet coil at an outer circumference and at least at one face of the magnet coil; a pole cap arranged in an interior of the housing, wherein the pole cap includes a pole core and a pole tube arranged in an axial sequence towards a face of the magnet coil, wherein the pole core and the pole tube are integrally connected in one piece by a connection bar, wherein the pole core is connected with the connection bar by a pole core cone and/or the pole tube is connected with the connection bar by a pole tube cone, and wherein the pole tube includes an end that is closed with a termination plate at a face of the pole tube that is oriented away from the connection bar.

18 Claims, 4 Drawing Sheets

(51) Int. Cl.
  *H01F 7/16* (2006.01)
  *F16K 3/02* (2006.01)
(52) U.S. Cl.
  CPC ........ *F16K 3/0254* (2013.01); *F16K 31/0613* (2013.01); *F16K 31/0675* (2013.01); *H01F 7/1607* (2013.01); *Y10T 137/86622* (2015.04)
(58) Field of Classification Search
  USPC ................................ 137/625.65; 251/129.15
  See application file for complete search history.

(56) References Cited

U.S. PATENT DOCUMENTS

| | | | |
|---|---|---|---|
| 2009/0032753 | A1 | 2/2009 | Ishibashi |
| 2011/0115587 | A1 | 5/2011 | Ishibashi |
| 2012/0199773 | A1 | 8/2012 | Miura |

FOREIGN PATENT DOCUMENTS

| | | |
|---|---|---|
| DE | 102011053023 A1 | 2/2013 |
| JP | 2008157270 A | 7/2008 |

* cited by examiner

HYDRAULIC VALVE

RELATED APPLICATIONS

This application claims priority from and incorporates by reference German Patent application DE 10 2014 013 602.7, filed on Sep. 18, 2014 which is incorporated in its entirety by this reference.

FIELD OF THE INVENTION

The invention relates to a hydraulic valve, in particular a hydraulic transmission valve of a motor vehicle.

BACKGROUND OF THE INVENTION

A transmission valve has to have a high level of robustness in order to be fail safe when transmission oil change intervals are very long, in the extreme when there are so called service life fillings. A high level of robustness can be achieved when moving parts have large clearances. However, this degrades control quality.

A hydraulic valve is known from DE 10 2011 053 023 A1 which has a high level of robustness in addition to high control quality. The high level of robustness is achieved in that contaminant particles in the operating medium cannot cause the transmission valve to jam since the armature can impart axial forces that are high enough so that the armature can always pull itself clear. At the same time the hydraulic valve provides a high level of control quality which is achieved by several design measures. Thus, in particular transversal forces between the armature and a pole tube are minimized.

A design measure of this type for minimizing transversal forces is a very tight operating clearance between the armature and the pole tube which is achieved with a very thin separation layer instead of for example a non-magnetic sleeve or a non-magnetic coating. A very thin separation layer of this type is advantageously provided with a layer thickness of less than 60 μm. The thin separation layer can be applied for example chemically or through a galvanic process. For a chemical method, for example chemical nickel plating can be used.

In order to obtain a proportional behavior of the transmission valve, DE 10 2011 053 023A1 provides a pole core cone. The pole core cone of this type also facilitates implementing other force/distance diagrams. However, a linear force/distance diagram is typically desirable to simplify regulation.

BRIEF SUMMARY OF THE INVENTION

Thus, it is an object of the invention to provide a hydraulic valve, in particular a hydraulic transmission valve which provides a very high level of robustness with long transmission oil change intervals combined with economical construction.

The object is achieved by a hydraulic valve, in particular a hydraulic transmission valve including a magnetizable housing which envelops a magnet coil at an outer circumference and at least at one face of the magnet coil; a pole cap arranged in an interior of the housing, wherein the pole cap includes a pole core and a pole tube arranged in an axial sequence towards a face of the magnet coil, wherein the pole core and the pole tube are integrally connected in one piece by a connection bar, wherein the pole core is connected with the connection bar by a pole core cone, and/or wherein the pole tube is connected with the connection bar by a pole tube cone, and wherein the pole tube includes an end that is closed with a termination plate at a face of the pole tube which face is oriented away from the connection bar; and an armature that is supported in an interior of the pole cap, wherein a first recess is provided in a radial direction in a running surface between the armature and a portion of the pole core and/or of the connection bar.

The object is also achieved by a hydraulic valve, in particular a hydraulic transmission valve including a magnetizable housing which envelopes a magnet coil at an outer circumference and at least at one face of the magnet coil; a pole cap arranged in an interior of the housing, wherein the pole cap includes a pole core and a pole tube arranged in an axial sequence towards a face of the magnet coil, wherein the pole core and the pole tube are integrally connected in one piece by a connection bar, wherein the pole core is connected with the connection bar by a pole core cone and/or wherein the pole tube is connected with the connection bar by a pole tube cone, and wherein the pole tube includes an end that is closed by a termination plate at a face of the pole tube which face is oriented away from the connection bar; and an armature that is supported in an interior of the pole cap, wherein a recess is provided in a radial direction in a running surface between the pole tube and the armature.

Advantageous embodiments and advantages of the invention can be derived from the description and the drawing figure.

A hydraulic valve, in particular a hydraulic transmission valve is proposed which includes a magnetizable housing which envelops a magnet coil at an outer circumference and at least at one face. Additionally the hydraulic valve includes a pole cap arranged in an interior of the housing wherein the pole cap includes a pole core and a pole tube arranged in axial sequence towards the face of the magnet coil, wherein the pole core and the pole tube are integrally connected in one piece by a connection bar, wherein the pole core is connected through a pole core cone with the connection bar and/or the pole tube is connected by a pole tube cone with the connection bar, and wherein the pole tube includes an end closed by a termination plate at a face oriented away from the connection bar. The hydraulic valve includes an armature that is supported in an interior of the pole cap, wherein a radial recess is provided in a running surface between the armature and a portion of the pole core and/or a portion of the connection bar.

The hydraulic valve according to the invention which implements a magnet concept with a single piece pole cap including the pole core/pole tube includes a shoulder for mechanical relief in the portion of the connection bar at the pole cap in order to prevent possible component deformations and a resultant negative influence upon armature travel in the pole cap and a magnet valve hysteresis caused thereby.

A single piece pole cap made from the pole core and the pole tube has an advantage in that a mechanical axis of the entire pole cap can be determined when the pole cap is fabricated so that a running surface of the magnet armature is defined in a favorable manner since the two axes of pole cap and magnet armature can be caused to coincide in order to provide advantageous running properties of the armature. Since the armature does not directly contact the inner wall of the pole core in the portion of the connecting bar due to the shoulder, the armature does not impart any forces upon the pole core and the longitudinal axis of the pole cap defined during fabrication is not deformed by the relatively thin connecting bar between pole core and pole tube due to forces imparted by the armature upon the pole core.

The shoulder can be arranged in the pole cap or in the armature between circumferential recesses oriented in a radial direction. The recesses can be ring grooves that have different depth in the radial direction or a ring groove or an annular gap with different depth. The shoulder then represents a transition between recesses with different depths.

An advantage resulting from a shoulder at the pole cap on the one hand side is an increase of robustness of the magnet/valve against forces imparted during component manufacture. Furthermore, the connection bar at the pole cap is mechanically unloaded since the armature does not run directly on the connection bar. A functional influencing of the magnet due to plastic deformation of the sensitive thin wall connection bar during fabrication of the pole cap is prevented. A deformation of this type could be caused for example by torsion or elastic displacement of the wall during machining and finishing of the pole cap due to the differences in wall thickness.

Another advantage is an increase of robustness of the magnet/valve against thermal influences/forces during operations. The connection bar is mechanically unloaded. Thus, a functional influence upon the magnet due to thermal deformation of the sensitive thin wall connection bar is prevented.

As an additional advantage the hydraulic valve according to the invention provides a reduction of magnetic transversal forces in the portion of the relief shoulder in order to minimize the magnet hysteresis and thus the valve hysteresis.

In an advantageous embodiment, a second recess in the radial direction can be provided in a running surface between pole tube and armature. The running surface can be associated with the pole tube or the armature. Using a recess of this type which can be for example implemented radially circumferential forms an additional contaminant reservoir which prevents a negative influence upon the armature travel in the pole cap and a magnet/valve hysteresis caused thereby. This provides an increase of the robustness of the magnet against contamination of the operating medium using an optional radial circumferential annular groove in the armature running borehole of the pole cap in order to form a contaminant reservoir between the armature and the pole cap that is recessed in the portion of the armature enveloping surface.

According to another aspect, the invention relates to a hydraulic valve, in particular a hydraulic transmission valve which includes a magnetizable housing which envelopes a magnet coil at an outer circumference and at least at one face. Furthermore, the hydraulic valve includes a pole cap arranged in an interior of the housing wherein the pole cap includes a pole core and a pole tube in an axial sequence towards a face of the magnet coil, wherein the pole core and the pole tube are integrally connected in one piece by a connection bar, wherein the pole core is connected by a pole core cone with the connection bar and/or the pole tube is connected by a pole tube cone with the connection bar, and wherein the pole tube includes an end that is closed with a termination plate at a face that is oriented away from the connection bar. The hydraulic valve furthermore includes an armature that is supported in an interior of the pole cap, wherein a recess is provided in a running surface between the pole tube and the armature. A hydraulic valve of this type includes a recess forming a contaminant reservoir between the armature and the pole cap that is recessed in the portion of the armature enveloping surface. This yields the advantages described supra.

In another advantageous embodiment, a first recess in radial direction can be provided at the hydraulic valve between the armature and a portion of the pole core and/or of the connection bar. This first recess can be used as an unloading recess for mechanically unloading the sensitive rather thin walled connection bar during fabrication, but also during operation of the hydraulic valve with the advantages recited supra. Furthermore, this causes a reduction of mechanical transversal forces in the portion of the relief recess in order to minimize the magnet hysteresis and thus the valve hysteresis.

The first recess can be configured in radial direction as a ring groove with different depth or e.g. as a ring groove and annular gap with different depth.

Advantageously, a wiper edge can be configured at one end of the first recess in a portion of a transition between connection bar and a pole tube cone. The first recess which terminates at one side in an edge which can be used as wiper edge for wiping off particles included in the operating medium from the running surface of the magnet armature, thus represents an additional contaminant reservoir in front of the magnet armature in the pole cap in the portion of the connection bar. Wiping possibly occurring particles from the armature running surface prevents a restriction of free movement of the magnet armature.

In order to secure the function of hydraulic valves in a mechatronic transmission control, it is required as a matter of principle to support magnet armatures as robust as possible in order to counter external influences. Thus, in addition to obtaining mechanical robustness, robustness against contaminated operating media is of crucial importance. In particular large particles can lead to a restriction of the magnet and valve function causing an impairment of the magnetic and/or hydraulic function up to a failure through blockage due to excessively low operating gaps and running clearances.

The hydraulic valve according to the invention can be used as a transmission valve for comfortably friction locking transmission clutches, in particular startup or switching clutches or synchronizing clutches facilitating operations with very few or no transmission oil changes. Furthermore, a transmission valve of this type can also be used in countries where there are low quality transmission oils.

The wiper edge according to the invention causes an increase of the robustness of the magnet against contamination of the operating medium due to a wiping effect between the armature and the recessed pole cap at the wiper edge of the pole cap.

In an advantageous embodiment, the first recess can be configured as an annular groove. A radial circumferential first recess configured as an annular groove is easy to fabricate and has operational advantages due to rotation symmetry, since the armature does not run on a surface that has a preferred orientation but which is substantially independent from a rotational orientation due to rotation symmetrical friction distribution.

In another advantageous embodiment, the second recess can also be configured as a ring groove. Also here the rotation symmetry of the arrangement with respect to the forces on the running surface of the armature represent an advantage. Furthermore an annular groove can be fabricated in a simple manner.

Advantageously the armature can also be supported in an interior of the pole tube. Also when there is a recess in the pole tube, for example configured as a ring groove, both bars at both ends of the recess can form a guide and support for the armature. In any case it is useful when the armature is supported in the pole tube since the pole tube can be configured as a relatively stiff unit and thus deviations from an ideal cylindrical running surface of the armature can be minimized.

In an advantageous embodiment, the recess can extend in the portion of the pole tube axially up to the pole tube cone between the connection bar and the pole tube. Thus, a particular length of the recess is provided and the contaminant reservoir thus has a sufficient volume in order to implement a high service life of the transmission without transmission oil change.

According to an advantageous embodiment, the first and the second recess can be axially offset from one another. Thus, on the one hand side a separation of the two contaminant reservoirs is provided, on the other hand side, at least one bar is provided between the first and the second recess as a guide and support for the movement of the armature. The second guide is advantageously formed at an end of the second recess which end is arranged opposite to the first recess.

According to an advantageous embodiment, the first recess can be continued in a form of an annular gap to a forward armature cavity. An embodiment of this type has the advantage that the smallest possible amount of contaminant particles can move into the running surface of the armature from the forward armature cavity where they could degrade the running surface of the armature. On the other hand side, the first recess forms a contaminant particle reservoir for contaminant particles which are wiped off at the wiper edge.

The annular gap is configured rather small and prevents that the armature comes in direct contact with the pole core during a movement of the armature and therefore the armature does not impart any forces upon the pole core. The annular gap is advantageously configured thin enough so that no contaminant particles can move from the forward armature cavity into the first recess.

According to an advantageous embodiment, the second recess can be closed towards a rear armature cavity. This way a second support can be implemented in a simple manner in addition to the first support between the first and the second recess for the armature. Thus, the contaminant reservoir formed by the second recess is closed and no additional contaminants can move from the rear armature cavity onto the armature running surface.

According to an advantageous embodiment, the wiper edge of the first recess can be arranged at an axial level proximal to a face of the armature in an operating position of the armature. An arrangement of the wiper edge as far forward as possible at the face of the armature provides that the running surface of the armature is kept free from contaminant particles over its entire length.

According to an advantageous embodiment, the first recess can be arranged at the connecting bar or adjacent thereto. Thus, a recessed pole cap of this type, even when a second recess is arranged at the armature, can be combined with an armature of this type for increasing robustness against contamination of the operating medium.

According to another advantageous embodiment, the first recess can also be arranged at the armature. Also this provides mechanical relief of the pole cap since the armature does not have any direct contact with the inner contour and thus with the running surface of the pole cap in this area.

According to an advantageous embodiment the second recess can be arranged at the pole cap. Thus, the armature can have a continuous outer surface which is advantageous for homogeneous running properties of the armature.

According to another advantageous embodiment the second recess can also be arranged at the armature. Alternatively, however, it is also possible to arrange the second recess and thus an additional mechanical relief and an additional contaminant reservoir in the outer surface of the armature in order to thus obtain favorable running properties of the armature also when the operating medium is loaded with contaminants.

BRIEF DESCRIPTION OF THE DRAWINGS

Further advantages can be derived from the subsequent description of the drawings. The drawings illustrate embodiments of the invention. The drawings, the description and the claims include numerous features in combination. A person skilled in the art will advantageously appreciate the features individually and will combine them into additional advantageous combinations. Advantageous embodiments are now described with reference to the drawing figures, wherein:

DETAILED DESCRIPTION OF THE INVENTION

Figure 1:
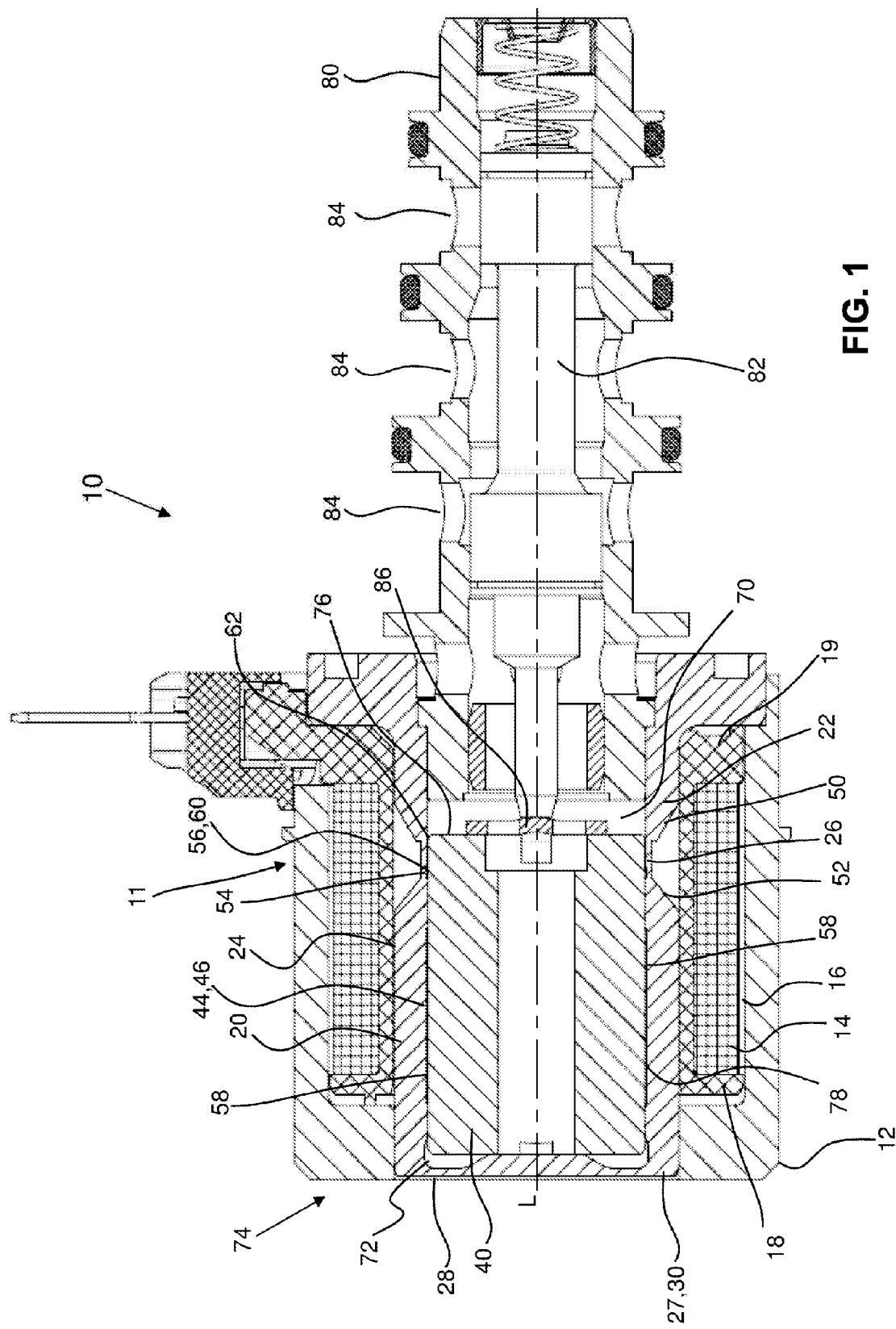
FIG. 1 illustrates a sectional view of a hydraulic valve according to an embodiment of the invention in a rear operating position.

In the figures, identical or analogous components are designated with identical reference numerals. The figures only illustrate exemplary embodiments and they do not limit the scope of the invention.

FIG. 1 illustrates a sectional view of a hydraulic valve 10 according to an embodiment of the invention in a rear operating position 74. The hydraulic valve 10 which is configured as a hydraulic transmission valve in FIG. 1 includes a magnetizable housing 12 which envelops a magnet coil 14 at an outer circumference 16 and at least at one face 18. The magnet coil 14 is embedded or cast into a support element 19, advantageously made from plastic material for the purpose of electrical insulation. The support element 19 is in turn closely enveloped by the housing 12 at an outer circumference 16.

A pole cap 20 is arranged in an interior of the housing 12 wherein the pole cap 20 includes a pole core 22 and a pole tube 24 in an axial sequence towards the face 18 of the magnet coil 14. The pole core 22 and the pole tube 24 are thus integrally connected in one piece by a connection bar 26 wherein the pole core 22 is connected through a pole core cone 50 with the connection bar 26 and the pole tube 24 is connected through a pole tube cone 52 with the connection bar 26. The pole tube 24 has a free end 30 at a face 27 oriented away from the connection bar 26 wherein the free end is closed by a terminal plate 28. In the interior 46 of the pole cap 20, the armature 40 is supported on a longitudinal axis L that is jointly defined between the pole cap 20 and the armature 40. The armature 40 drives a hydraulic piston 82 through a connection portion 86 wherein the hydraulic piston provides hydraulic control for a transmission in a valve housing 80 with plural hydraulic connections. The hydraulic function is not described in more detail.

The magnetic coil 14 arranged in the housing 12, the connection bar 26 and the pole cap 20 enveloping the pole core 22 and the pole tube 24 and the armature 40 form the essential portion of a magnetic actuator 11 of the hydraulic valve 10.

A first recess 56 is provided in a portion of the pole core 22 and of the connection bar 26 wherein a wiper edge 54 is formed at one end of the first recess 56 in a portion of a transition between the connecting bar 26 and a pole tube cone 52. The wiper edge 54 is arranged in an operating position 74 of the armature 40 in which the armature 40 contacts the termination plate 28 at an axial level proximal to the face 76 of the armature 40 and is used for wiping off contaminant particles formed by mechanical abrasion or by chipping residues in the hydraulic fluid which is used to operate the hydraulic valve 10. This prevents that contaminant particles of this type can reach the running surface 58 of the armature 40.

Figure 4:
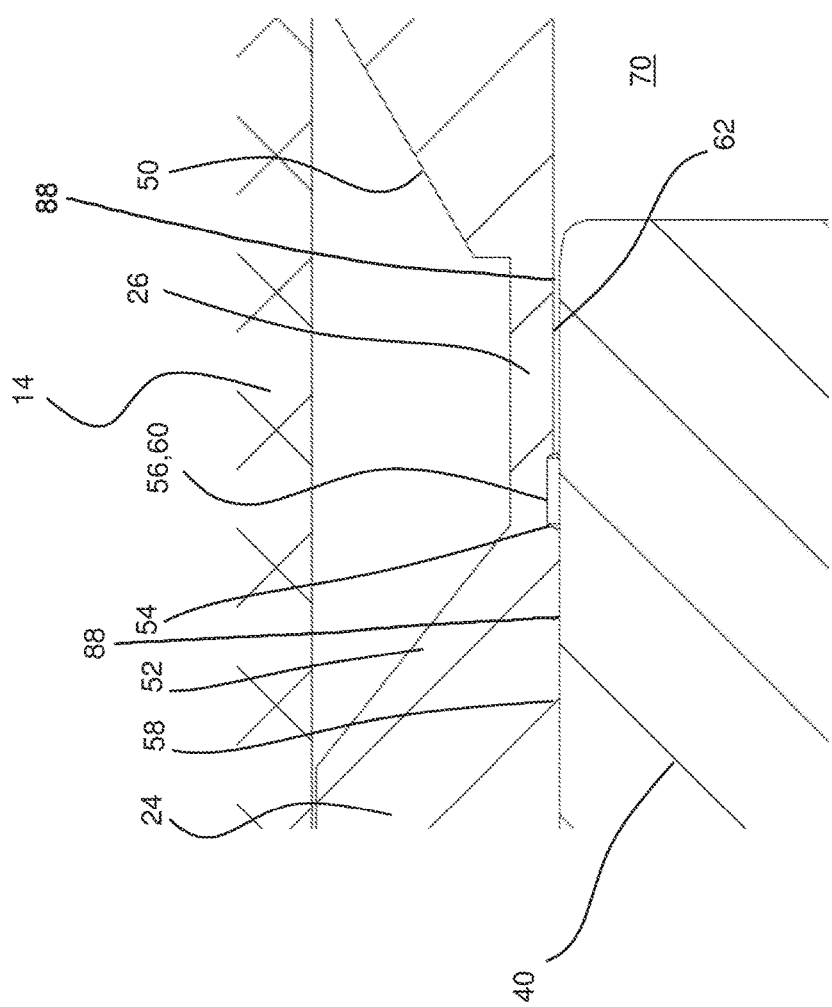
FIG. 4 illustrates another detailed sectional view of the hydraulic valve of FIG. 1 focusing on the first recess and a wiper edge of the pole tube.

The first recess 56 is provided as an annular groove 60 and extended by an annular gap 62 as illustrated in FIG. 4 up to a forward armature cavity 70. The first recess 56 is arranged at a portion of the axial height of the connecting bar 26. In an alternative embodiment of the invention the first recess 56, however, can also be arranged at the armature 40. A first recess 56 with a continuation in the form of an annular gap 62 towards the forward cavity 70 in the portion of the relatively thin walled connecting bar 26 prevents that forces from a movement of the armature 40 are imparted upon the connecting bar 26 and the pole core 22, so that the pole cap 20 goes through a deformation of its longitudinal axis L. This robust embodiment of the pole cap 20 relative to deformations due to mechanical or thermal deformation also provides that the armature 40 during its movement in the magnet actuator 11 deviates as little as possible from the ideal longitudinal axis L which is defined by the fabrication of the pole cap 20 so that the actuator 40 can operate in an energy efficient manner.

In a running surface 58 between the pole tube 24 and the armature 40 a second recess 44 is provided which is configured as annular groove 46. The recess 44 extends in the portion of the pole tube 24 in axial direction to the pole tube cone 52 between the connecting bar 26 and the pole tube 24 and serves as an additional contaminant reservoir for contaminant and/or abrasion particles in the hydraulic fluid. The first recess 56 and the second recess 44 are axially offset from one another, wherein the second recess 44 is closed towards a rear armature cavity 72, so that the armature 40 is guided and supported in an interior 48 of the pole tube 24 at a portion of the pole tube 24 which has remained standing at both ends of the second recess 44 at the running surface 58 of the armature 40. The second recess 44 is arranged in the illustrated embodiment at the pole tube 24. In an alternative embodiment the second recess 44, however, can also be arranged at the armature 40.

Figure 2:
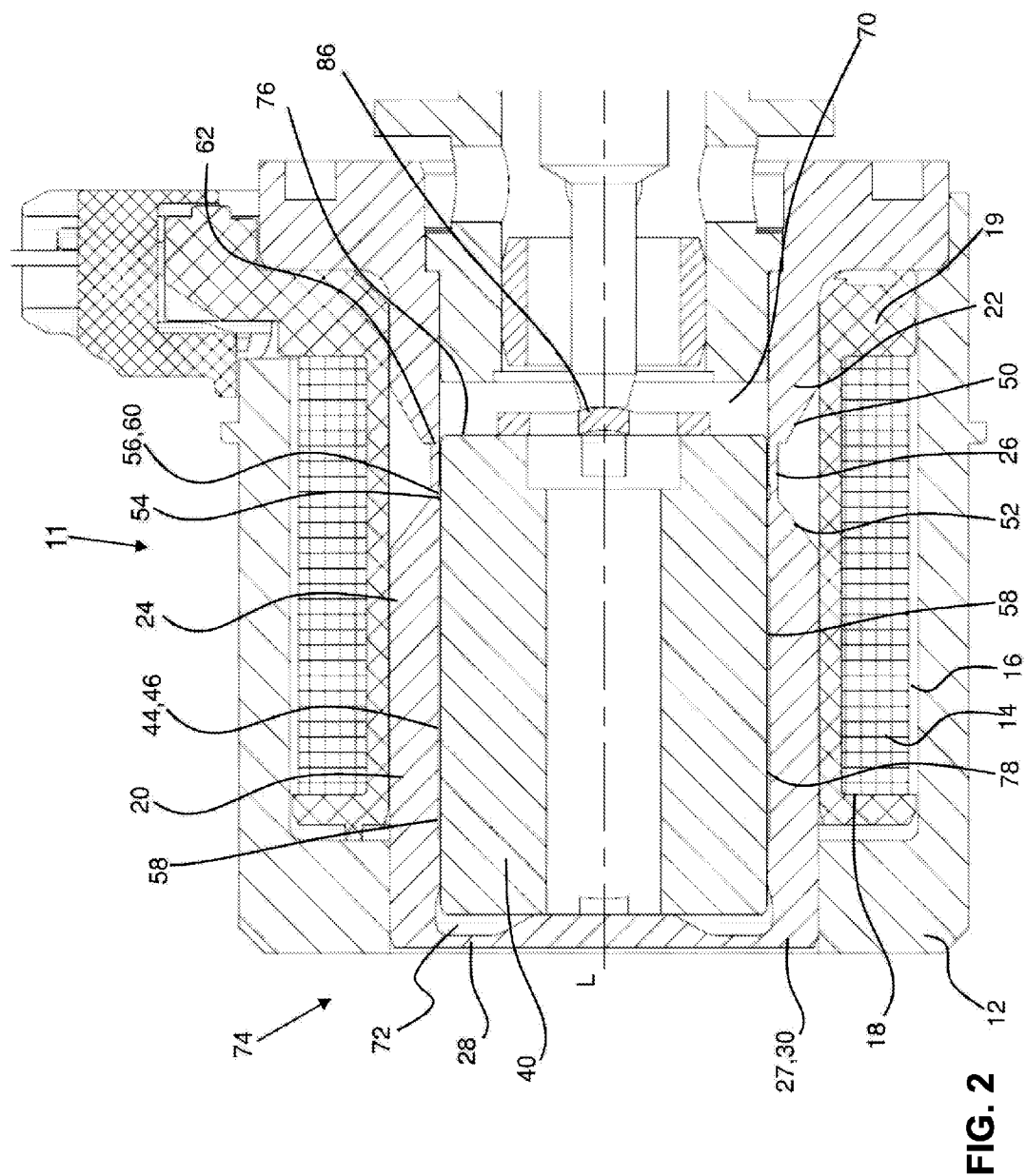
FIG. 2 illustrates an enlarged sectional view through the portion of the magnet actuator of the hydraulic valve of FIG. 1 in a rear switching position.

FIG. 2 illustrates a larger sectional view of the portion of the actual magnetic actuator 11 of the hydraulic valve 10 of FIG. 1 in a rear switching position 74. The magnet actuator 11 thus includes the magnet coil 14 arranged in the housing 12, the connection bar 26 and the pole cap 20 including the pole core 22 and the pole tube 24 and the armature 40. Details of the first recess 56 in the connection bar 26 and of the second recess 44 in the pole tube 24 are clearly visible in FIG. 2.

Figure 3:
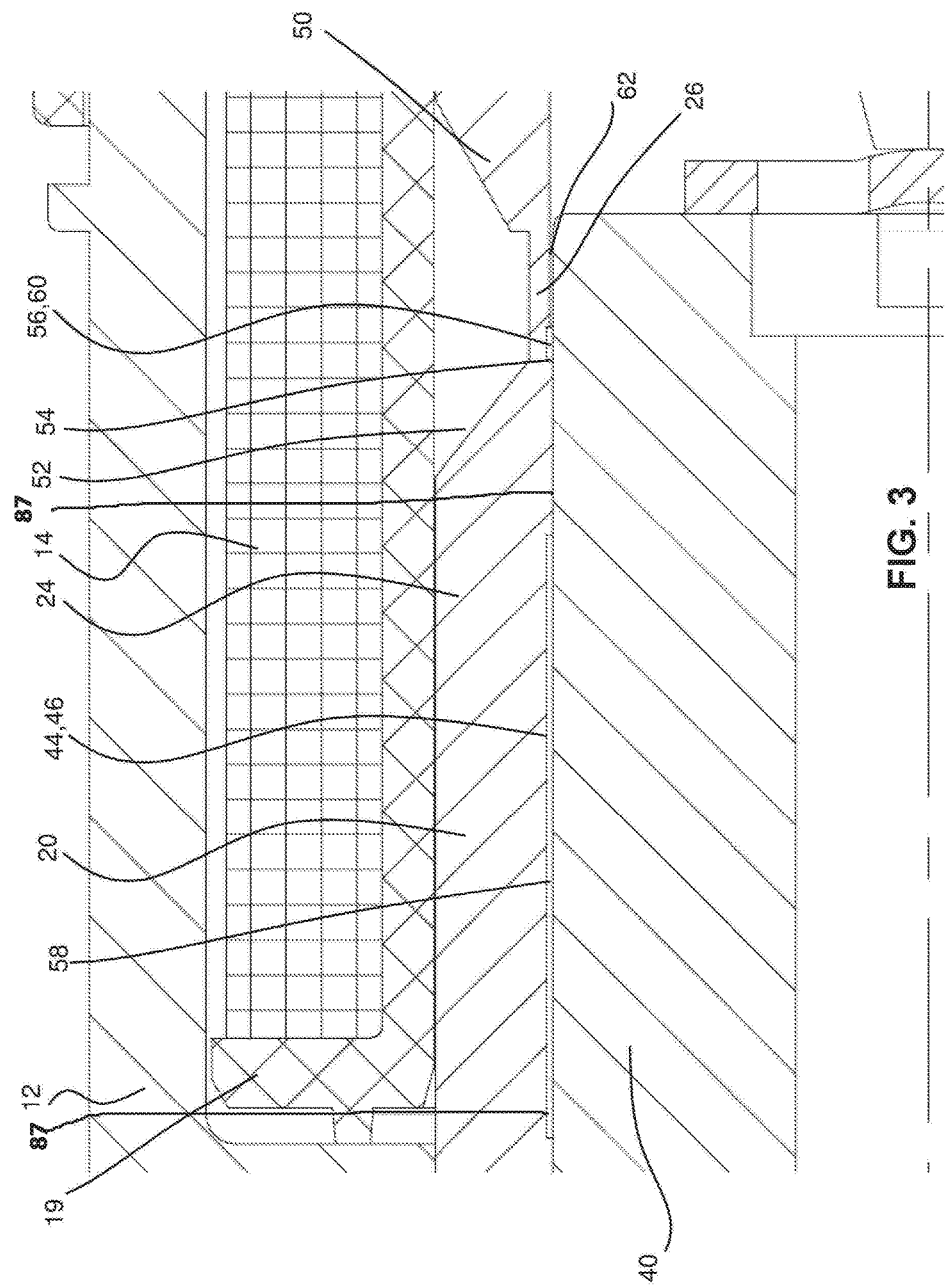
FIG. 3 illustrates a detailed sectional view of the hydraulic valve of FIG. 1 focusing on a first recess and a second recess of the pole tube.

FIG. 3 illustrates a detailed sectional view of the hydraulic valve 10 of FIG. 1 focusing on the first recess 56 and the second recess 44 of the pole tube 24. The first recess 56 is configured as a ring groove 60 defined by radially inward oriented protrusions 88 on either axial side of the first recess and, the pole tube 24 is for example cut out through milling on a portion of the axial length of the connecting bar 26 between the pole core cone 50 and the pole tube cone 52. The first recess 56 begins at one end with the wiper edge 54 at a transition between the pole tube cone 52 and the connecting bar 26 and terminated at the length of the connecting bar 26.

The second recess 44 which is also configured as an annular groove 46 is defined by radially inward oriented protrusions 87 with equal circumference on either axial side of the second recess and extends over a portion of the axial length of the pole tube 24.

FIG. 4 illustrates another detailed view of the hydraulic valve 10 of FIG. 1 focusing on the first recess 56 and the wiper edge 54 of the pole tube 24. The first recess 56 with its wiper edge 54 at the transition between the connecting bar 26 and the pole tube cone 52 is configured as an annular groove 60 in the portion of the connecting bar 26. The first recess 56 is continued in the embodiment illustrated in FIG. 4 as an annular gap 62 between the connecting bar 26 and the armature 40 in an open manner towards the forward armature cavity 70, so that the armature 40 which is guided and supported in the portion of the pole tube 24 on the running surface 58 between the armature 40 and the pole tube 24 does not have any direct contact with the connecting bar 26 in the portion of the connecting bar 26 so that it does not impart any forces upon the rather thin walled connecting bar 26. This robust embodiment of the pole cap 20 with respect to deformations due to mechanically or thermally induced shape changes provides that the armature 40 deviates as little as possible from the ideal longitudinal axis L which is defined by the fabrication of the pole cap 20 during a movement of the armature in the magnet actuator 11.

REFERENCE NUMERALS AND DESIGNATIONS 10 hydraulic valve
11 magnet actuator
12 housing
14 magnet coil
16 outer circumference
18 face
19 plastic support element
20 pole cap
22 pole core
24 pole tube
26 connecting bar
27 face of pole tube
28 terminal plate
30 end of pole tube
40 armature
42 inside
44 recess
46 annular groove
48 interior
50 pole core cone
52 pole tube cone
54 wiper edge
56 first recess
58 running surface
60 ring groove 62 annular gap
70 forward armature cavity
72 rear armature cavity
74 rear operating position
76 face
78 outer surface
80 valve housing
82 piston
84 hydraulic connection
86 connecting portion
87 radially inward oriented protrusion
88 radially inward oriented protrusion

What is claimed is:

1. A hydraulic valve, comprising:
a magnetizable housing which envelops a magnet coil at an outer circumference and at least at one face of the magnet coil;
a pole cap arranged in an interior of the housing,
wherein the pole cap includes a pole core and a pole tube arranged in an axial sequence towards the at least one face of the magnet coil,
wherein the pole core and the pole tube are integrally connected in one piece by a connection bar,
wherein the pole core is connected with the connection bar by a pole core cone or the pole tube is connected with the connection bar by a pole tube cone, and
wherein the pole tube includes an end that is closed with a termination plate that forms a part of the pole tube at a face of the pole tube which face is oriented away from the connection bar; and
an armature that is supported in an interior of the pole cap on a running surface for the armature which running surface extends along an axial travel range of the armature between operating positions of the armature,
wherein the armature is configured to come in contact with a hydraulic fluid controlled by the hydraulic valve,
wherein a first recess is provided in a radial direction in the running surface for the armature and the first recess is provided in a portion of the pole core or of the connection bar so that the armature continuously covers at least a portion of the first recess within the axial travel range of the armature between the operating positions of the armature,
wherein the first recess is defined by radially inward oriented protrusions on either axial side of the first recess,
wherein the first recess is continued axially as an annular gap to a forward armature cavity, and
wherein an outer circumference of the annular gap is greater than a maximum circumference of the armature.

2. The hydraulic valve according to claim 1, wherein a second recess is provided in a radial direction in the running surface for the armature and the second recess is provided in the pole tube.

3. The hydraulic valve according to claim 2, wherein the first recess and the second recess are axially offset from each other.

4. The hydraulic valve according to claim 1, wherein a wiper edge is provided at an end of the first recess in a portion of a transition between the connection bar and the pole tube cone.

5. The hydraulic valve according to claim 1, wherein the first recess is configured as at least one ring groove.

6. The hydraulic valve according to claim 5,
wherein the first recess is configured as double ring groove including a ring groove with a smaller depth and a ring groove with a larger depth, and
wherein the ring groove with the smaller depth adjoins in the axial direction to the ring groove with the larger depth towards the connection bar.

7. The hydraulic valve according to claim 1, wherein a second recess is configured as a ring groove.

8. The hydraulic valve according to claim 1, wherein the armature is supported in an interior of the pole tube.

9. The hydraulic valve according to claim 1, wherein a second recess extends in a portion of the pole tube axially to the pole tube cone between the connection bar and the pole tube.

10. The hydraulic valve according to claim 1, wherein a second recess is closed towards a rear armature cavity.

11. The hydraulic valve according to claim 1, wherein a wiper edge is arranged in a rear operating position of the armature at an axial level proximal to a face of the armature.

12. The hydraulic valve according to claim 1, wherein the first recess is arranged at or adjacent to the connection bar.

13. The hydraulic valve according to claim 1, wherein a second recess is arranged at the pole tube.

14. A hydraulic valve, comprising:
a magnetizable housing which envelops a magnet coil at an outer circumference and at least at one face of the magnet coil;
a pole cap arranged in an interior of the housing,
wherein the pole cap includes a pole core and a pole tube arranged in an axial sequence towards the at least one face of the magnet coil,
wherein the pole core and the pole tube are integrally connected in one piece by a connection bar,
wherein the pole core is connected with the connection bar by a pole core cone or the pole tube is connected with the connection bar by a pole tube cone, and
wherein the pole tube includes an end that is closed by a termination plate that forms a part of the pole tube at a face of the pole tube which face is oriented away from the connection bar; and
an armature that is supported in an interior of the pole cap on a running surface for the armature which running surface extends along an axial travel range of the armature between operating positions of the armature,
wherein the armature is configured to come in contact with a hydraulic fluid controlled by the hydraulic valve,
wherein a second recess defined by radially inward oriented protrusions with equal circumference on either axial side of the second recess is provided in a radial direction in the running surface for the armature and the second recess is provided in the pole tube so that the armature continuously covers the second recess within the axial travel range of the armature between the operating positions of the armature.

15. The hydraulic valve according to claim 14, wherein a first recess is provided in the radial direction in the running surface for the armature and the first recess is provided in a portion of the pole core or of the connection bar.

16. A hydraulic valve, comprising:
a magnetizable housing which envelops a magnet coil at an outer circumference and at least at one face of the magnet coil;
a pole cap arranged in an interior of the housing,
wherein the pole cap includes a pole core and a pole tube arranged in an axial sequence towards a face of the magnet coil,
wherein the pole core and the pole tube are integrally connected in one piece by a connection bar, wherein the pole core is connected with the connection bar by a pole core cone and the pole tube is connected with the connection bar by a pole tube cone, and wherein the pole tube includes an end that is closed with a termination plate at a face of the pole tube which face is oriented away from the connection bar; and an armature that is supported in an interior of the pole cap on a running surface for the armature which running surface extends along an axial travel range of the armature between operating positions of the armature, wherein the armature is configured to come in contact with a hydraulic fluid controlled by the hydraulic valve, wherein a first recess is provided in a radial direction in the running surface for the armature and the first recess is provided in a portion of the pole core and of the connection bar so that the armature continuously covers at least a portion of the first recess within the axial travel range of the armature between the operating positions of the armature, wherein the first recess is defined by radially inward oriented protrusions on either axial side of the first recess, wherein the first recess is continued axially as an annular gap to a forward armature cavity, and wherein an outer circumference of the annular gap is greater than a maximum circumference of the armature.

17. A hydraulic valve, comprising:

a magnetizable housing which envelops a magnet coil at an outer circumference and at least at one face of the magnet coil;

a pole cap arranged in an interior of the housing, wherein the pole cap includes a pole core and a pole tube arranged in an axial sequence towards a face of the magnet coil, wherein the pole core and the pole tube are integrally connected in one piece by a connection bar, wherein the pole core is connected with the connection bar by a pole core cone and the pole tube is connected with the connection bar by a pole tube cone, and wherein the pole tube includes an end that is closed by a termination plate at a face of the pole tube which face is oriented away from the connection bar; and an armature that is supported in an interior of the pole cap on a running surface for the armature which running surface extends along an axial travel range of the armature between operating positions of the armature, wherein the armature is configured to come in contact with a hydraulic fluid controlled by the hydraulic valve, and wherein a second recess defined by radially inward oriented protrusions with equal circumference on either axial side of the second recess is provided in a radial direction in the running surface for the armature and the second recess is provided in the pole tube so that the armature continuously covers the second recess within the axial travel range of the armature between the operating positions of the armature.

18. The hydraulic valve according to claim 17, wherein a first recess is provided in the radial direction in the running surface for the armature and the first recess is provided in a portion of the pole core and of the connection bar.

* * * * *